(12) United States Patent
Fischer

(10) Patent No.: US 7,567,999 B2
(45) Date of Patent: Jul. 28, 2009

(54) DEVICE AND METHOD FOR CALCULATING A RESULT OF A DIVISION

(75) Inventor: Wieland Fischer, Munich (DE)

(73) Assignee: Infineon Technologies AG (DE)

( * ) Notice: Subject to any disclaimer, the term of this patent is extended or adjusted under 35 U.S.C. 154(b) by 824 days.

(21) Appl. No.: 10/917,262

(22) Filed: Aug. 12, 2004

(65) Prior Publication Data

US 2005/0038845 A1 Feb. 17, 2005

Related U.S. Application Data

(63) Continuation of application No. PCT/EP03/00669, filed on Jan. 23, 2003.

(30) Foreign Application Priority Data

Feb. 12, 2002 (DE) ................................ 102 05 713

(51) Int. Cl.
 *G06F 7/52* (2006.01)
(52) U.S. Cl. ....................... 708/650; 708/652; 708/653; 708/655; 708/656; 380/28
(58) Field of Classification Search .......... 708/650–656
 See application file for complete search history.

(56) References Cited

U.S. PATENT DOCUMENTS

| | | | | | |
|---|---|---|---|---|---|
| 4,484,259 | A | * | 11/1984 | Palmer et al. ................ | 708/620 |
| 5,321,752 | A | * | 6/1994 | Iwamura et al. .............. | 713/174 |
| 5,499,299 | A | * | 3/1996 | Takenaka et al. ............... | 380/28 |
| 5,644,639 | A | * | 7/1997 | Naciri et al. ................... | 380/30 |
| 6,088,453 | A | * | 7/2000 | Shimbo ........................ | 380/28 |

(Continued)

FOREIGN PATENT DOCUMENTS

DE 100 21 920 C1 7/2001

(Continued)

OTHER PUBLICATIONS

Takagi, Naofuni; A Radix-4 Modular Multiplication Hardware Algorithm for Modular Exponentiation; Issue 8; Aug. 1992, pp. 949-956.*

(Continued)

*Primary Examiner*—Lewis A Bullock, Jr.
*Assistant Examiner*—Michael Yaary
(74) *Attorney, Agent, or Firm*—Dickstein, Shapiro, LLP.

(57) ABSTRACT

A device for calculating a result or an integer multiple of the result of a division of a numerator by a denominator includes a unit for providing a factor which is selected such that a product of the factor and the denominator is greater than the result. The device further includes a unit for modularly reducing a first product of the numerator and the factor using a modulus equaling a sum of a second product of the denominator and the factor and of an integer to obtain an auxiliary quantity having the result. A unit is used to extract the result or the integer multiple of the result from the auxiliary quantity. A division is thus reduced to a modular reduction and an extraction which is uncomplicated as far as calculation is concerned so that, in particular in long-number division tasks, the speed on the one hand and the safety on the other hand are increased.

29 Claims, 3 Drawing Sheets

U.S. PATENT DOCUMENTS

| | | | |
|---|---|---|---|
| 6,175,850 B1 * | 1/2001 | Ishii et al. | 708/491 |
| 6,415,310 B1 * | 7/2002 | Takenaka et al. | 708/491 |
| 6,763,365 B2 * | 7/2004 | Chen et al. | 708/491 |
| 7,277,540 B1 * | 10/2007 | Shiba et al. | 380/28 |
| 2002/0055962 A1 * | 5/2002 | Schroeppel | 708/650 |

FOREIGN PATENT DOCUMENTS

WO     WO-99/50739 A1     10/1999

OTHER PUBLICATIONS

Freking, W.L. et al; A Unified Method for Iterative Computation of Modular Multiplication and Reduction Operations; Oct. 10-13, 1999; pp. 80-87.*

Ching Yu Hung et al.: "Fast RNS division algorithms for fixed divisors with application to RSA encryption"; Information Processing Letters, Aug. 24, 1994, Netherlands, Bd. 51, Nr. 4, pp. 163-169, XP-002267751.

Eldridge S E et al.: "Hardware Implementation of Montgomery's Modular Multiplication Algorithm"; IEEE Transactions on Computers, IEEE Inc. New York, USA, Bd. 46, Nr. 6, Jun. 1, 1993, pp. 693-699; XP 000578160.

John L Hennessy et al.: "Computer Arithmetic": Computer Architecture A Quantitive Approach, Second Edition, Morgan Kaufmann Publishers, Inc., 1996.

* cited by examiner binary long-number register with $(H*2^e-Q)$ msb side      lsb side   300

H    -Q e positions $\widehat{=}$ factor $2^e = F$

DEVICE AND METHOD FOR CALCULATING A RESULT OF A DIVISION

CROSS-REFERENCE TO RELATED APPLICATION

This application is a continuation of copending International Application No. PCT/EP03/00669, filed Jan. 23, 2003, which designated the United States and was not published in English, and is incorporated herein by reference in its entirety.

BACKGROUND OF THE INVENTION

1. Field of the Invention

The present invention relates to cryptographic algorithms and, in particular, to division algorithms suitable for cryptographic applications.

2. Description of the Related Art

The division of two long numbers is often required in cryptographic algorithms. In the RSA algorithm, for example, the modulus N is a product of two prime numbers p, q, wherein q is obtained when N is divided by p, or p is obtained when N is divided by q.

If a division routine is not incorporated on a cryptographic coprocessor used for this as an explicit command consisting of micro-commands which are internally processed quickly, the division must take place by means of software. Conventional division routines for this are slow on the one hand and not safe against SPA attacks (SPA=Simple Power Analysis) on the other hand.

Usual division routines, as are, for example, described in "Computer Arithmetic", Henessy and Patterson, Morgan Kaufmann Publishers, Inc., 1996, such as, e.g., the restoring division, the non-restoring division etc., are based on register shifts taking place and subtractions or additions being performed, depending on whether certain bits have certain values. Routines of this kind are susceptible to SPA attacks since the current or power consumption and, additionally, the time consumption depend on the numbers to be processed. An attacker could thus draw conclusions as to the numbers processed from the current or time profile and thus for example spy out a secret key of a public-key crypto algorithm.

In order to tackle this problem, so-called dummy operations by which a homogenization of the current profile can be obtained are incorporated. The incorporation of dummy operations, however, results in an additional performance loss which can amount to 33%.

SUMMARY OF THE INVENTION

It is the object of the present invention to provide a more efficient and safer concept for calculating a division.

In accordance with a first aspect, the present invention provides a device for calculating a result or an integer multiple of the result of a division of a numerator by a denominator, having: a unit for providing a factor selected such that a product of the factor and the denominator is greater than the result; a unit for modularly reducing a first product of the numerator and the factor using a modulus equaling a sum of a second product of the denominator and the factor and of an integer to obtain an auxiliary quantity having the result; and a unit for extracting the result or the integer multiple of the result from the auxiliary quantity.

In accordance with a second aspect, the present invention provides a method for calculating a result or an integer multiple of the result of a division of a numerator by a denominator, having the following steps: providing a factor which is selected such that a product of the factor and the denominator is greater than the result; modularly reducing a first product of the numerator and the factor using a modulus equaling a sum of a second product of the denominator and the factor and of an integer to obtain an auxiliary quantity having the result; and extracting the result or the integer multiple of the result from the auxiliary quantity.

The present invention is based on the finding that, in particular for cryptographic purposes, classic division routines must be dropped to perform a division. According to the invention, a division is reduced to a modular reduction by introducing a factor which is selected such that a product of the factor and the denominator for the division is greater than the result of the division. The modular reduction is executed on a first product of the numerator and the factor, wherein a modulus equaling a sum of a second product of the denominator and the factor and of an integer is used to obtain an auxiliary quantity comprising the result of the division. Finally, the result can be extracted from the auxiliary quantity without great calculating complexity.

The inventive concept is of advantage in that the current and/or time profile are independent from the quantities to be processed, i.e. the numerator and the denominator. In addition, the modular reduction to which the division to be calculated is finally reduced can be executed in a calculating-efficient way. In particular in crypto processors, the modular reduction is a frequently used operation for which efficient algorithms are typically implemented as hardware in a crypto coprocessor. The modular reduction can thus be calculated in a fast and efficient way.

Depending on the hardware implementation, the extraction of the result of the division from the auxiliary quantity can either be read directly from a long number register when a register of sufficient length is present.

Alternatively, another modular reduction and a subtraction can be performed for extracting the result, wherein in this case the calculating complexity also remains within sensitive limits since the other modular reduction, too, is executed in a fast and safe way using efficient reduction circuits which are present on crypto coprocessors anyway.

The inventive concept provides an essential acceleration of the division with simultaneously increasing the safety. A division of long numbers, in a well-known processor ACE (ACE=Advanced Crypto Engine), available from Infineon Technologies AG, Munich, Germany, requires about 27 clocks per bit. The inventive division, on the same processor, only requires 6 clocks per bit, which corresponds to an acceleration of 4.5 times.

The inventive division concept is, at the same time, safe against SPA attacks since the current or time consumption is independent of the special bit pattern of the numbers processed, i.e. of the numerator and the denominator.

BRIEF DESCRIPTION OF THE DRAWINGS

Preferred embodiments of the present invention will be detailed subsequently referring to the appendage drawings, in which.

DESCRIPTION OF THE PREFERRED EMBODIMENTS

Figure 1:
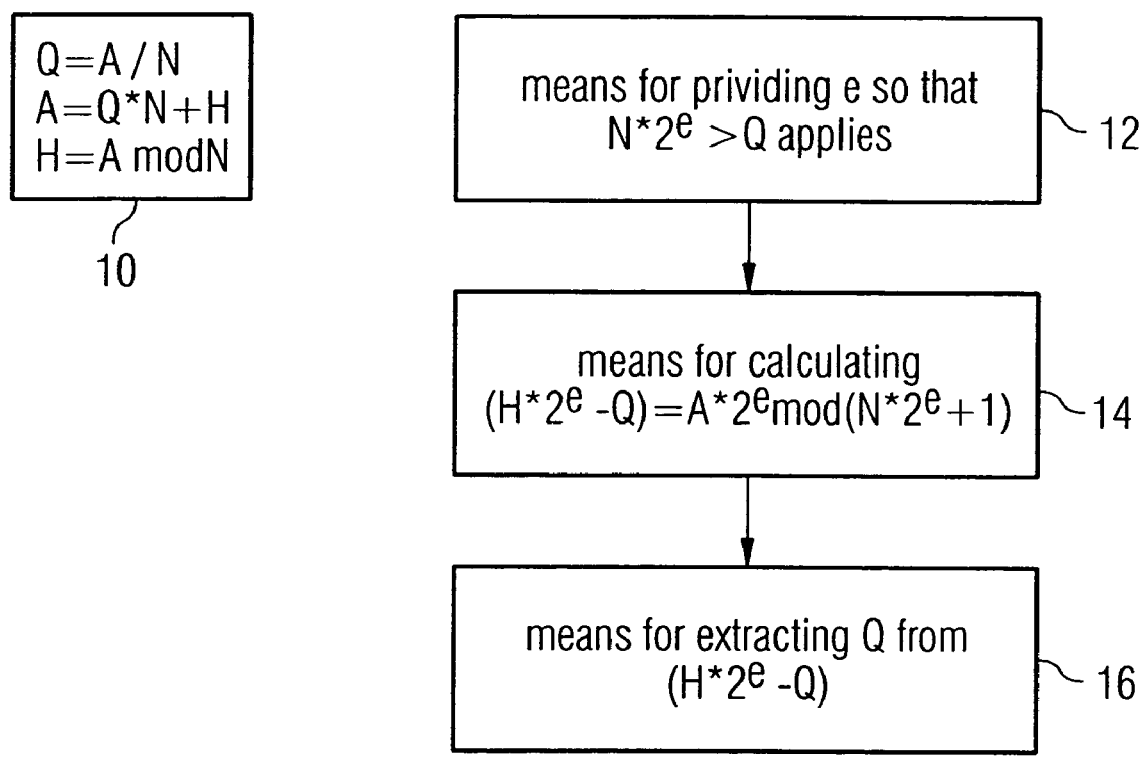
FIG. 1 is a block diagram of an inventive device for calculating a division.

Before the figures will be explained in greater detail, the derivation of the inventive division concept which bases on a modular reduction of a first product of the numerator and the factor will be explained, wherein the modulus equals a sum of a second product of the denominator and the factor and an integer.

The result Q of a division of a numerator A by a denominator N according to the following equation is sought:

$$Q=A/N \tag{1}$$

Without limiting the generality, it is assumed that both the numerator A and the denominator N are binary numbers, so that the following applies:

$$2^{a-1} \leq A < 2^a \tag{2a}$$

$$2^{n-1} \leq N < 2^n \tag{2b}$$

Equations 2a and 2b indicate the orders of magnitude of the numerator A and the denominator N.

Equation 1 can be transformed as follows:

$$A = Q \cdot N + H \tag{3a}$$

The value H of equation 3 is calculated as follows:

$$H = A - Q \cdot N \tag{3b}$$

wherein the value H is greater than or equal to 0 and smaller than N.

It becomes evident from equation 3a that the result Q of the division which will subsequently be of interest is the integer result while the quantity H is the remainder. The result Q of the division of A and N thus represents the result of the so-called DIV operation, while the remainder H is obtained by the modular reduction of the numerator A and the denominator N as a modulus:

$$H = A \bmod N. \tag{4}$$

It is to be pointed out that every floating-point division can be reduced to an integer division, namely, for example, by shifting the point and by rounding to the next integer. Usually, floating-point divisions are reduced to integer divisions within a calculating unit.

According to the invention, a factor F is introduced which, in the case of a binary number system, is defined as follows:

$$F = 2^e \tag{5}$$

The number 2 is the base since exemplarily only a binary number system is considered here, while the factor F results when the base 2 is raised to the power of an exponent e. According to the invention, the factor F must fulfil the following condition:

$$N \cdot F > Q \tag{6}$$

or, when equation 5 is inserted into equation 6:

$$N \cdot 2^e > Q \tag{7}$$

Thus, the factor is determined such that the product of the factor F and the denominator of the division (equation 1) is greater than the result Q of the division sought.

It is to be pointed out that the exact result Q of the division need not be known for this consideration because this is what is to be calculated. Only the order of magnitude of Q must be known in order to correctly dimension the factor F.

Usually it is, however, no problem to estimate the order of magnitude of the result of the division of the numerator and the denominator, in particular as equation 6 only includes a greater-than condition, so that a correct procedure of the algorithm is always ensured when the factor F is selected to be very large.

It is, however, preferred to rather select the factor to be smaller since the factor determines the length of the registers required for calculating the division. If the factor is selected to be very large, very long registers will be required, while shorter registers are sufficient when the factor F is selected to be smaller. The following equation 8 indicates a preferred dimensioning of the quantity e for the binary case (equation 5):

$$e \geq a + 2 - 2n \tag{8}$$

Equation 8 only contains information on the numerator A (equation 2a) and information on the denominator N (equation 2b). If e is dimensioned as in equation 8, the condition for the factor of equation 6 will always be fulfilled.

When equation 3 is multiplied by the factor F, the following equation results:

$$A \cdot F = Q \cdot N \cdot F + H \cdot F \tag{9}$$

When additionally equation 4 is also multiplied by the factor F on both sides, equation 10 will be the result:

$$H \cdot F = A \cdot F \bmod (N \cdot F) \tag{10}$$

In addition, the following applies:

$$0 \leq H \cdot F < N \cdot F \tag{11}$$

Equation 11 indicates that the result of the modular reduction of equation 10 must be within the remainder class of the modulus N·F, i.e. larger than or equal to 0 and smaller than N·F.

The result Q is then added to and simultaneously subtracted from the right side of equation 9, which corresponds to the following equation:

$$A \cdot F = Q \cdot N \cdot F + Q + H \cdot F - Q \tag{12}$$

When equation 12 is transformed such that the result Q of the first two terms on the right side of equation 12 is factored out, the following expression results:

$$A \cdot F = Q(N \cdot F + 1) + H \cdot F - Q \tag{13}$$

Alternatively, equation 12 can also be transformed such that the sum of HF and Q and not the difference of the two terms is formed:

$$A \cdot F = Q(N \cdot F - 1) + H \cdot F + Q \tag{13'}$$

A transformation of equation 13 or 13' such that the difference H·F−Q (or the sum of this) is on the left side of the equation, results in the following expression:

$$H \cdot F - Q = A \cdot F - Q(N \cdot F + 1) \tag{14}$$

The following results for the "sum alternative":

$$H \cdot F + Q = A \cdot F - Q(N \cdot F - 1) \tag{14'}$$

When equation 14 or 14' is then compared to equations 3a and 3b, it becomes evident that equation 14 is a new determination equation for a new division, wherein the difference or sum on the left side of equation 14 or 14', i.e. the auxiliary quantity (H·F−Q) or (H·F+Q), in which the result Q sought for is contained, corresponds to the remainder of an integer division of a numerator A·F by a denominator (N·F+1) or (N·F−1).

The remainder of this division, i.e. the auxiliary quantity on the left side of equation 14, can be calculated by the following equation 15 in analogy to equation 4:

$$H \cdot F - Q = A \cdot F \bmod (N \cdot F + 1) \tag{15}$$

Equation 15 thus represent the modular reduction which gives the auxiliary quantity H·F−Q as the result, from which, as will be illustrated subsequently, the result Q sought for can be extracted in different manners without considerable complexity. Equation 15 thus is the central modular reduction to which the division (equation 1) has been reduced. It is also to be noted that the difference on the left side of the previous equation could also be negative. In this case, the modulus is added in order for the equation to be true, in particular as the result of a modular reduction, as the definition says, may not be negative.

The following equation results for the "sum alternative":

$$H \cdot F + Q = A \cdot F \bmod (N \cdot F - 1) \tag{15'}$$

As will be explained subsequently, there are different possibilities to extract the result Q sought from the auxiliary quantity H·F+/−Q.

Figure 3:
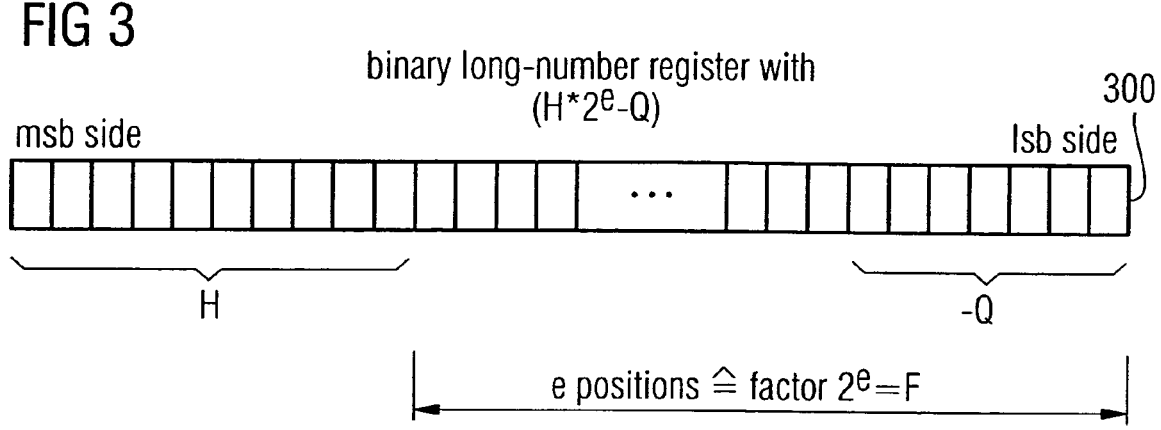
FIG. 3 is an illustration of the auxiliary quantity in a binary long-number register for explaining an extraction of the result from the auxiliary quantity.

For this, reference will first be made to FIG. 3 to show a manner for extracting the result Q of the division of the numerator A by the denominator N. FIG. 3 shows a binary long-number register 300 into which the result of the modular reduction of the right side of equation 15 has been stored. The long-number register has an msb side and an lsb side (msb=most significant bit; lsb=least significant bit).

The numbers H·F and Q are then in the register 300 as will be explained subsequently. The number H·F is a large number and, as regards its bit pattern, corresponds to the number H as is illustrated in FIG. 3, since the number H·F is obtained from the number H when the number H is shifted by i positions to the left in the long-number register, wherein the factor F is selected to be $2^e$.

In addition, a, compared to the number H·F, small number "+/−Q" is contained in the binary long-number register 300 of FIG. 3, i.e. the negative or positive of the result Q sought. If the long-number register 300 is large and the factor F has been selected to be as large that the numbers H and −Q and +Q, respectively, do not overlap in the register 300, wherein such a case is illustrated in FIG. 3, the number −Q sought can be read out directly from the register 300. The number Q results after inverting −Q. For this, the corresponding bits on the lsb side of the register are to be considered (which results in −Q). Subsequently, in the usual usage of the two's complement, the bit pattern contained therein is inverted, after which a one is added to the inverted bits to obtain the result Q sought.

Thus, only a simple arithmetic operation in the form of adding a one to the inverted bits is required. No larger arithmetic operations, such as, e.g., a subtraction using the register contents etc., are required. Due to the size differences of the numbers H·F and Q, it is easily possible to somehow read Q separately from the register 300, i.e. extract it from the auxiliary quantity (the left side of equation 15).

It is to be pointed out that the factor F need not be selected to be so great that the numbers H and −Q in the register shown in FIG. 3 do not have overlapping regions. Even if these numbers do have an overlapping region, it is also possible, as will be explained subsequently, to extract the number Q from the auxiliary quantity. Another modular reduction is executed for this, as is illustrated in equation 16:

$$H \cdot F = A \cdot F \bmod (N \cdot F) \tag{16}$$

Equation 16 corresponds to equation 4, wherein the factor F is, however, taken into consideration here.

The result Q sought in this case results by subtracting equation 15 from the result of equation 16:

$$H \cdot F - (H \cdot F - Q) = Q \tag{17}$$

The following differentiation of cases when the auxiliary quantity, i.e. the difference H·F−Q, is negative is to be pointed out. If the difference H·F−Q in equation 15 is negative, the modulus (N·F+1) is added to the left side of equation 15, since, according to definition, the result of a modular reduction is always to be positive. If the auxiliary quantity is negative so that a modulus is added to the left side in equation 15, this will be taken into consideration when subtracting equation 15 from equation 16 as follows:

$$Q = A \cdot F \bmod (N \cdot F) - A \cdot F \bmod (N \cdot F + 1) + N \cdot F + 1 \tag{18}$$

Subsequently, FIG. 1 will be dealt with to explain a block diagram of a preferred device for calculating a result or, as will be explained later, an integer multiple of the result Q of a division of a numerator by a denominator. The determination equations, for reasons of clarity, are illustrated in FIG. 1 in a block 10. The inventive device includes means 12 for providing a factor and, in particular, a number e which forms the factor as the exponent of the base 2, so that equation 6 and equation 7, respectively, are fulfilled.

The inventive device further includes means 14 for calculating the auxiliary quantity, i.e. for carrying out equation 15. Finally, the inventive device includes means 16 for extracting Q from the auxiliary quantity in one of different manners, such as, e.g., by the mechanism described in FIG. 3 or by calculating another modular reduction (equation 16) and by subtracting the result of the two modular reductions, as is illustrated by equation 17.

Figure 2:
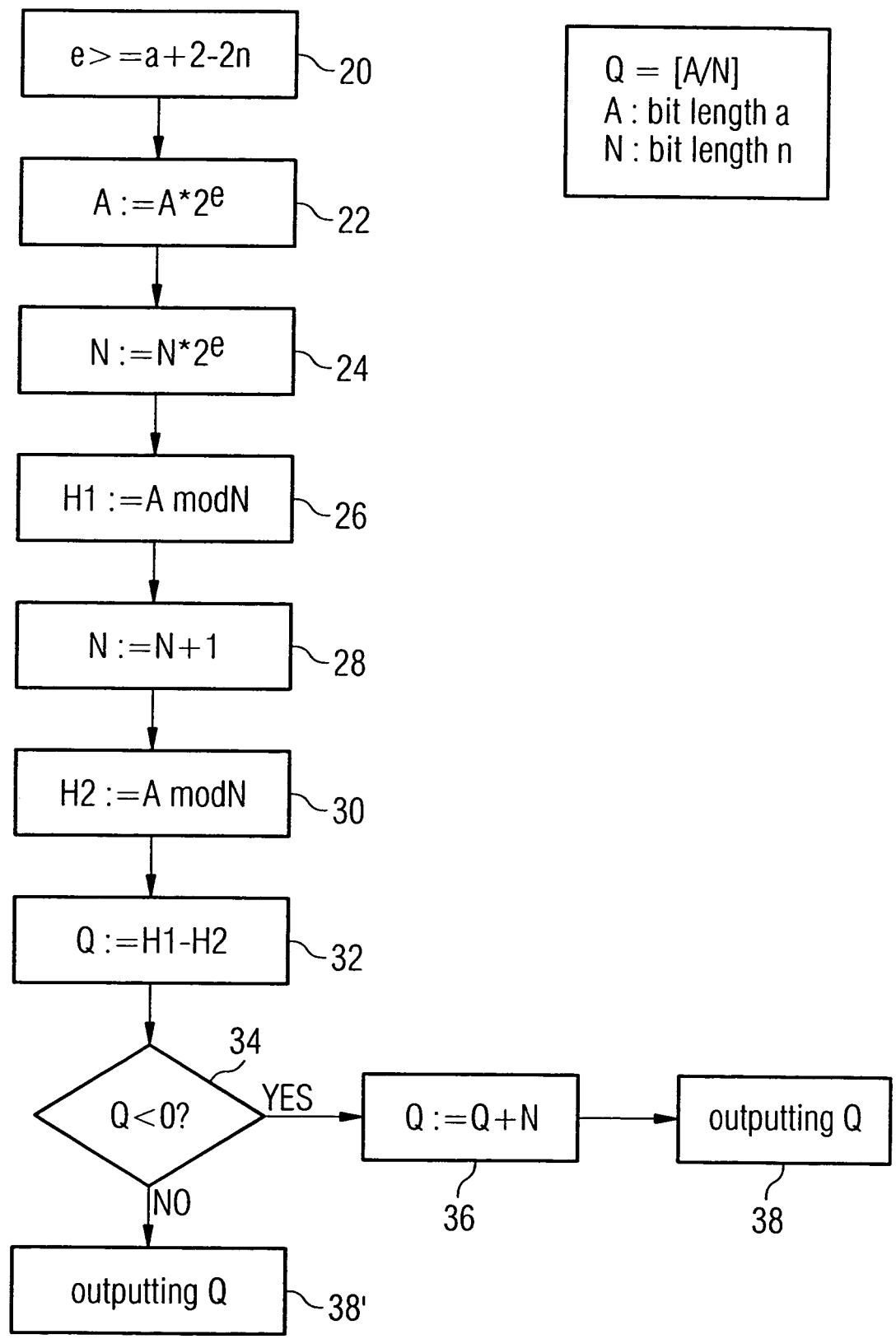
FIG. 2 is a block diagram of an inventive method according to a preferred embodiment.

Subsequently, reference will be made to FIG. 2 to illustrate a preferred method which can do with four registers only, i.e. a first register for the numerator A, a second register for the denominator N, a third register for the first auxiliary quantity Hi and a fourth register H2 for the second auxiliary quantity. Optionally, a fifth result register can be used, or the numerator register, the denominator register or the third register for the first auxiliary quantity can be used as the result register when desired.

In a step 20, the value e is at first selected according to equation 8. Subsequently, the numerator register is loaded with the first product A·F (step 22). Then, the denominator register is also re-loaded, with the second product (24). In a step 26, a modular reduction according to equation 16 is calculated. Subsequently, after the calculation in step 26, the denominator is incremented by 1 (step 28) to calculate the central reduction equation 15 in step 30. In step 32, a subtraction of the two relevant equations 15 and 16 is performed, as is illustrated by equation 17. After calculating the difference in step 32, step 34 checks whether the result is negative. If this is the case, the modulus will be added (step 36) to obtain the result Q of the division (step 38).

If it is, however, determined in step 34 that the result obtained by step 32 is larger than 0, this result will be output directly as the result of the division (step 38').

It is to be pointed out that the embodiment of the present invention shown in FIG. 2 can be used with special advantage when the numbers H and Q are overlapping in the binary long-number register 300 of FIG. 3 since in this case the processes described referring to FIG. 3 of reading out the lowest bits of the register 300 and subsequently of inverting to obtain the result Q do not lead to correct results. In the embodiment of the present invention shown in FIG. 2, means 16 for extracting the result Q from the difference $H \cdot 2^e - Q$ includes the functionality of steps 26, 32, 34 and 36.

As will be explained subsequently, the inventive concept, without increased complexity, can also be used to calculate not only the result of a division but also the integer multiple of the division. This can easily be obtained when an integer x>1 is inserted in the modulus on the right side of equation 15 instead of the number "1", wherein at the same time the result Q is also multiplied by the integer x on the left side of equation 15, so that the following equation 19 results:

$$H \cdot F - Q \cdot x = A \cdot F \bmod (N \cdot F + x) \qquad (19)$$

If a number x larger than 1 is used, this must also be taken into consideration in equation 6 when selecting the factor F in that the factor, compared to x=1, must be x times the result.

When considering equation 19, it shows that the result Q·x, which can, for example, be obtained by reading out the register, can either be used directly when a subsequent algorithm step does not require the result Q but x times the result Q.

When the result Q is required, when, however, the modular reduction with the modulus (N·F+x) for some reason can be calculated more easily than for the case x=1, this can alternatively be obtained by again dividing Q by x. In particular in the case in which x is an integer multiple of 2 and the system is a binary system, this can be obtained by shifting the register by a corresponding number of positions to the right.

When equation 19 is evaluated in analogy to equations 16 and 17, x times Q will be obtained.

Another alternative for extracting Q or a multiple of Q from equation 19 is to use the following equation 20 for evaluation, wherein equation 20 basically corresponds to equation 19, wherein this time the integer y is to be selected to be different from x. When equation 20 is then subtracted from equation 19, the result will be equation 21. It is not the result Q but an integer multiple of the result Q, namely the difference of y and x that results on the left side of equation 21. Q can be obtained from equation 21 by performing a division by (y−x). This division can be dispensed with when y and x are selected such that the difference thereof equals 1.

$$H \cdot F - Q \cdot y = A \cdot F \bmod (N \cdot F + y) \qquad (20)$$

$$Q \cdot (y-x) = A \cdot F \bmod (N \cdot F + x) - A \cdot F \bmod (N \cdot F + y) \qquad (21)$$

It is to be mentioned that the parameters x and y may also be negative, in analogy to the procedure which has been set forth in connection with equations (13') to (15').

The present invention, due to its flexibility, safety and performance, is suitable in particular for cryptographic algorithms and for cryptographic coprocessors on which a safe and efficient implementation of the modular reduction is typically implemented by means of a circuit.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A crypto processor for calculating a result or an integer multiple of the result of a division of a numerator by a denominator, comprising:
   a provision unit configured to provide a factor selected such that a product of the factor and the denominator is greater than the result;
   a modular reduction unit configured to modularly reduce a first product of the numerator and the factor using a modulus equaling a sum of a second product of the denominator and the factor and of an integer to obtain an auxiliary quantity comprising the result;
   a binary register for storing the auxiliary quantity comprising the result; and
   an extraction unit configured to extract the result or the integer multiple of the result from the auxiliary quantity stored in the binary register,
   wherein the result or the integer multiple of the result is calculated by the crypto processor in a cryptographic application, the numerator and the denominator being parameters in the cryptographic application, and
   wherein the result or the integer multiple of the result is used within the cryptographic application.

2. The crypto processor according to claim 1, wherein the provision unit is formed to determine the factor in such a way that a base raised to the power of an auxiliary quantity equals the factor.

3. The crypto processor according to claim 2, wherein the base is 2 so that the multiplication by the factor corresponds to a shift by a number of positions in a register, wherein the number of positions equals the auxiliary quantity.

4. The crypto processor according to claim 1,
   wherein a two's complement representation is used for representing negative numbers, and
   wherein the extraction unit comprises a reading unit configured to read out a lower portion of the binary register in which the result is contained and an inverting unit configured to invert a value read out and to add a one to obtain the result of the division.

5. The crypto processor according to claim 1,
   wherein the extraction unit comprises:
   a calculation unit configured to calculate, as another auxiliary quantity, a result of a modular reduction of the numerator multiplied by the factor, wherein the denominator multiplied by the factor is provided as the modulus; and
   a subtraction unit configured to subtract the auxiliary quantity from the other auxiliary quantity to obtain the result of the division.

6. The crypto processor according to claim 1, wherein the division is an integer division.

7. The crypto processor according to claim 3, wherein the auxiliary quantity is selected such that it equals the number of positions of the numerator minus double the number of positions of the denominator plus 2.

8. The crypto processor according to claim 5, wherein the extraction unit is arranged to decide whether the result is negative and, in this case, to add to the result the modulus provided in the modular reduction unit for being used.

9. The crypto processor according to claim 5, further comprising:
   a first register configured to store the numerator;
   a second register configured to store the denominator;
   a third register configured to store the other auxiliary quantity;
   a fourth register configured to store the auxiliary quantity; and
   a register control unit configured to control the calculation unit and the extraction unit to obtain the result.

10. The crypto processor according to claim 1,
   wherein the result, multiplied by an integer multiplier, is calculated,
   wherein the provision unit is arranged to provide a factor which is selected such that a product of the factor and the denominator and the result, multiplied by the integer multiplier, is greater than the result of the division, and
   wherein the modular reduction unit is formed to use a modulus equaling a sum of a product of the denominator and the factor and of the integer multiplier.

11. The crypto processor according to claim 1,
wherein the modular reduction unit is formed to use a modulus equaling a sum of a product of the denominator and the factor and of an integer, wherein the integer is greater than or equal to 1, and
wherein the extraction unit is arranged to perform a modular reduction using a modulus equaling a sum of a product of the denominator and the factor and of another integer, wherein the other integer is unequal to the integer so that the result of the division is obtained by the extraction unit when a difference of the other integer and the integer equals 1, or the result, multiplied by an integer multiplier, is obtained, wherein the integer multiplier equals the difference of the other integer and the integer.

12. The crypto processor according to claim 1, embodied as a crypto coprocessor of a cryptographic device.

13. The crypto processor according to claim 1, wherein the integer is negative so that the result can be obtained without inversion.

14. The crypto processor according to claim 11, wherein the other integer is a negative integer.

15. The crypto processor according to claim 1, wherein the modular reduction unit is implemented as hardware in a crypto coprocessor.

16. A method for calculating a result or an integer multiple of the result of a division of a numerator by a denominator, comprising:
providing a factor which is selected such that a product of the factor and the denominator is greater than the result;
modularly reducing a first product of the numerator and the factor using a modulus equaling a sum of a second product of the denominator and the factor and of an integer to obtain an auxiliary quantity comprising the result;
storing the auxiliary quantity comprising the result in a binary register; and
extracting the result or the integer multiple of the result from the auxiliary quantity stored in the binary register,
wherein the result or the integer multiple of the result is calculated by a crypto processor in a cryptographic application, the numerator and the denominator being parameters in the cryptographic application, and
wherein the result or the integer multiple of the result is used within the cryptographic application.

17. The crypto processor according to claim 1, embodied as a cryptoprocessor of a cryptographic device.

18. The method according to claim 16, wherein the providing step comprises determining the factor in such a way that a base raised to the power of an auxiliary quantity equals the factor.

19. The method according to claim 18, wherein the base is 2 so that the multiplication by the factor corresponds to a shift by a number of positions in a register, wherein the number of positions equals the auxiliary quantity.

20. The method according to claim 16, further comprising:
using a two's complement representation for representing negative numbers, and
wherein the extracting step comprises: reading out a lower portion of the binary register in which the result is contained; inverting a value read out; and adding a one to obtain the result of the division.

21. The method according to claim 16, wherein the extracting step comprises:
calculating, as another auxiliary quantity, a result of a modular reduction of the numerator multiplied by the factor, wherein the denominator multiplied by the factor is provided as the modulus; and
subtracting the auxiliary quantity from the other auxiliary quantity to obtain the result of the division.

22. The method according to claim 16, wherein the division is an integer division.

23. The method according to claim 19, further comprising selecting the auxiliary quantity such that it equals the number of positions of the numerator minus double the number of positions of the denominator plus 2.

24. The method according to claim 21, wherein the extracting step comprises deciding whether the result is negative and, in this case, adding to the result the modulus provided in the modularly reducing step.

25. The method according to claim 16,
further comprising calculating the result, multiplied by an integer multiplier,
wherein the provision step comprises providing a factor which is selected such that a product of the factor and the denominator and the result, multiplied by the integer multiplier, is greater than the result of the division, and
wherein the modularly reducing step comprises using a modulus equaling a sum of a product of the denominator and the factor and of the integer multiplier.

26. The method according to claim 16,
wherein the modularly reducing step comprises using a modulus equaling a sum of a product of the denominator and the factor and of an integer, wherein the integer is greater than or equal to 1, and
wherein the extraction step comprises performing a modular reduction using a modulus equaling a sum of a product of the denominator and the factor and of another integer, wherein the other integer is unequal to the integer so that the result of the division is obtained by the extracting step when a difference of the other integer and the integer equals 1, or the result, multiplied by an integer multiplier, is obtained, wherein the integer multiplier equals the difference of the other integer and the integer.

27. The method according to claim 16, wherein the integer is negative so that the result can be obtained without inversion.

28. The method according to claim 26, wherein the other integer is a negative integer.

29. A crypto processor for calculating a result or an integer multiple of the result of a division of a numerator by a denominator within a cryptographic algorithm, wherein the numerator and the denominator are parameters in the cryptographic algorithm, comprising:
a provision circuit configured to provide a factor selected such that a product of the factor and the denominator is greater than the result;
a modular reduction circuit configured to modularly reduce a first product of the numerator and the factor using a modulus equaling a sum of a second product of the denominator and the factor and of an integer to obtain an auxiliary quantity comprising the result;
a binary register for storing the auxiliary quantity comprising the result; and
an extraction circuit configured to extract the result or the integer multiple of the result from the auxiliary quantity stored in the binary register,
wherein the result or the integer multiple of the result is calculated by the crypto processor in a cryptographic application, the numerator and the denominator being parameters in the cryptographic application, and
wherein the result or the integer multiple of the result is used within the cryptographic application.

* * * * *